June 1, 1954 A. SIMMON 2,679,784
LANTERN SLIDE PROJECTOR HAVING LENSES OF DIFFERENT FOCUS
Filed May 16, 1951 2 Sheets-Sheet 1
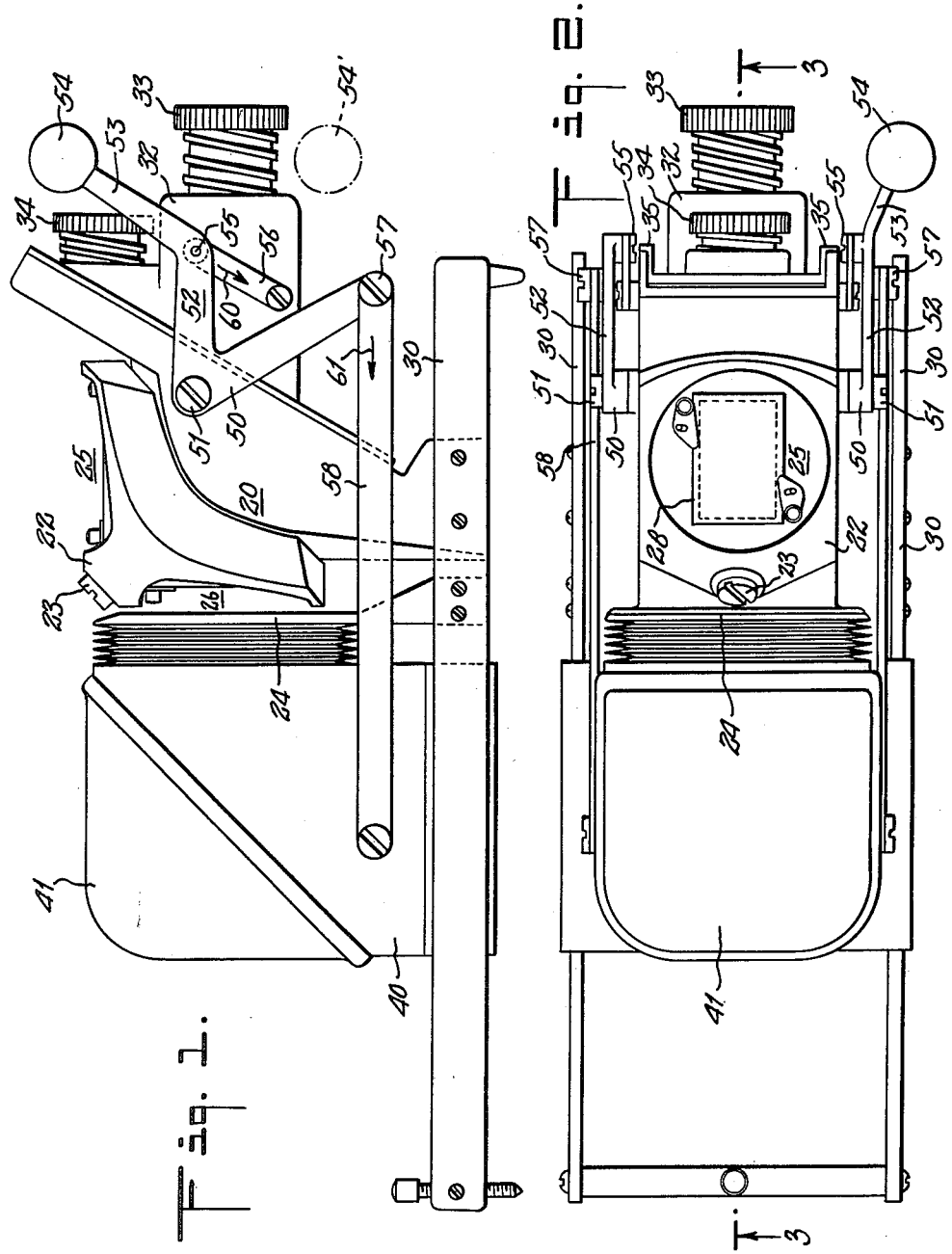
INVENTOR.
ALFRED SIMMON
BY
Kenyon & Kenyon
ATTORNEYS

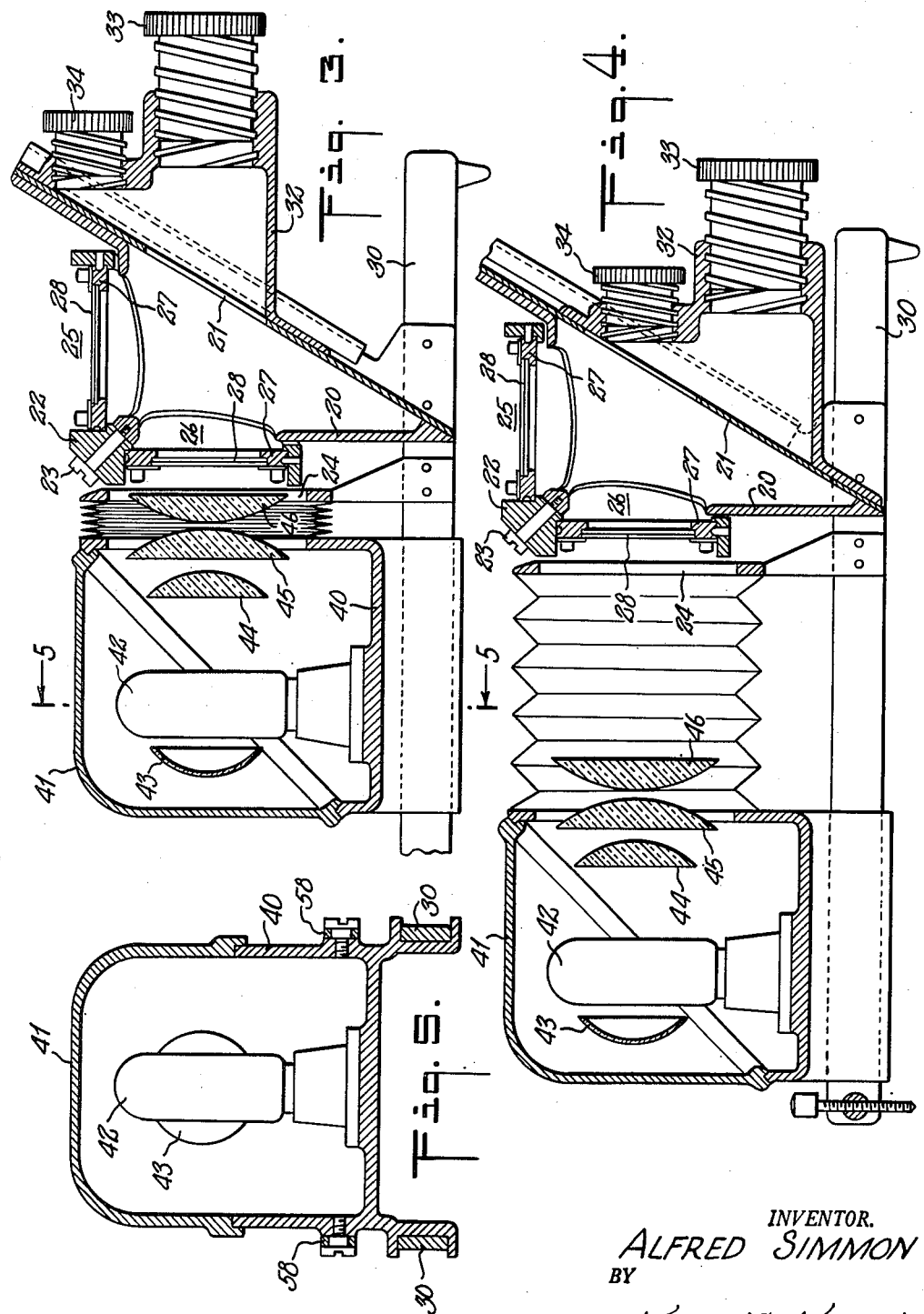

Patented June 1, 1954

2,679,784

UNITED STATES PATENT OFFICE 2,679,784

LANTERN SLIDE PROJECTOR HAVING LENSES OF DIFFERENT FOCUS

Alfred Simmon, Jackson Heights, N. Y., assignor to Simmon Brothers, Inc., Long Island City, N. Y., a corporation of New York Application May 16, 1951, Serial No. 226,632

6 Claims. (Cl. 88—26)

This invention relates to lantern slide projectors.

One of the objects of the invention is to provide such a projector which can accommodate lantern slides of two different sizes to project either with suitable magnification upon a screen in such a way that the projected images are of substantially the same dimensions.

Another object of the invention is to provide a projector of this type which may be used to project part of a large lantern slide on the screen with higher magnification than would be used for projecting the entire slide.

Another object of the invention is to provide such a slide projector in which the adjustment from one size of slide or one magnification to another can be made simply, easily and accurately and substantially instantaneously.

Other objects and advantages of the invention will be apparent from the following specification and the drawings in which:

Fig. 1 is a side elevational view of a projector embodying the invention showing the projector set for one size of transparency;

Fig. 2 is a top plan view of the projector shown in Fig. 1;

Fig. 3 is a detailed longitudinal section of the device shown in Fig. 1;

Fig. 4 is a detailed longitudinal section through the device shown in Fig. 1 with the device set for a magnification or slide different from that shown in Figs. 1, 2 and 3, and Fig. 5 is a detailed sectional view taken on the line 5—5 of Fig. 3.

It has been common to equip optical instruments with a plurality of lenses mounted on a movable carrier so that one or the other may be used in the optical system to obtain different magnification of the optical image. Attempts to apply a similar device to a lantern slide projector have not been satisfactory for reasons of efficiency. The illuminating system of a projector necessarily includes a condenser system which must be so adjusted relative to a projecting lens that an image of the source of light is projected into the pupil of the projecting lenses. Projecting lenses of different focal lengths assume different distances from the transparencies to be projected for a given screen distance. This in turn necessitates a corresponding adjustment of the illuminating system. In the present invention, the entire illuminating system consisting of the source of light and one or several condenser lenses is shifted as a unit relative to the transparency to be projected. The magnitude of this shift is such that the rays of the light are always properly focused in the pupil of the selected projecting lens. The projector comprises a stationary base, a front part movable relative thereto which carries two projecting lenses of different focal lengths, a rear part movable relative to the center portion or base and which contains the illuminating system and a control mechanism operatively connected to simultaneously move both movable parts.

The central portion of the device is formed by a hollow cone-shaped body 20 which may be a casting. This part has an inclined front 21 into which a sliding lens carier fits to form the above-mentioned movable front part of the projector. The hollow cone 20 lies on an axis having an inclination of 45° with reference to the optical axis of the projector. It carries at its apex a second hollow cone-shaped body 22 which acts as a holding device for two transparencies or lantern slides. This holder forms no part of this invention since it is covered by a co-pending application.

The hollow cone 22, the apex angle of which is 90°, is rotatably mounted on an axis 23. Two circular apertures 25 and 26 are provided in the body 22. Each of these holds a rotatable disk 27 which, in turn, supports a lantern slide 28. When one of these slides is in a vertical position it is ready for projection and lies across the optical axis of the projector. The other slide at this time is presented in a horizontal plane for convenient observation by the operator of the machine.

Two rails 30 are fastened to and extend horizontally of the central part 20. A frame 24 is likewise fastened to these rails in a vertical position.

The front portion of the projector consists of a body 32 which is slidable in a generally vertical direction along the inclined front surface of the center part 20. This body 32 carries a long focus projecting lens 33 and directly thereabove a short focus projecting lens 34. Both lenses are equipped with individual helical focusing mounts for adjustment. Angle piece 35 forms a channel into which part 32 is fitted.

The movable rear portion consists of a base 40 which may be a casting and a cover 41 which form a closed housing for the illuminating system. The illuminating system comprises a conventional incandescent lamp 42 backed by a mirror 43 and a condenser system which, in the form of the invention shown, consists of three lenses 44, 45 and 46. These lenses are all mounted on the base 40 by conventional means which are not shown, since mounts for lenses are well-known in the art and form no part of this invention. The front portion of housing 40 is open and is connected to the open frame 24 with a light type of extensible element which is shown in the form of a conventional bellows.

The control mechanism serves a dual purpose. It either brings the long focus lens 33 or the short focus lens 34 into coincidence with the optical axis of the projector and simultaneously adjusts the distance between the illuminating system and the projecting lens so that the rays of the lamp 42 are properly focused in the pupil of the selected projecting lens. This mechanism consists of a bell crank 50 having a substantially horizontal leg 52 and a substantially vertical leg 53 and a handle 54 extending upwardly from leg 52. The leg 52 carries a pivot 55 for one end of a connecting rod or link 56 which is pivotally connected to the movable front part 32. The leg 53 carries a pivot 57 for a connecting rod or link 58 which is pivotally connected to the lamp housing 40. Similar elements may be disposed on both sides of the projector in the preferred form of the invention, although not strictly necessary.

In Figs. 1, 2 and 3, the projector is adjusted for use with the long focus lens 33. This lens lies at the optical axis of the projector and the rear part contains the illuminating system as disposed close to the center part 20 which carries the transparency 28 held in a vertical plane. The various distances have been chosen so that the rays of the lamp 32 are focused by the condensing lenses 44, 45 and 46 into the pupil of the lens 33.

If the operator wishes to project a smaller transparency or the center of the transparency shown in the projector at a higher magnification, he switches to the short focal length lens 34. This is done by depressing the handle 54 to the position 54' shown in dotted lines in Fig. 1. This will swing the legs 52 and 53 in the clockwise direction as viewed in Fig. 1. Moving the pivot 55 in the direction indicated generally by the arrow 60 in Fig. 1, point 57 will also move generally in the direction of the arrow 61 in Fig. 1.

This movement through the lengths 56 and 58 will displace the lens 33 downwardly and bring the lens 34 into position on the optical axis of the projector as shown in Fig. 4. The entire illuminating system moves to the left or rearwardly of the machine to the position shown in Fig. 4. In this position, the illuminating system is farther away from the stationary part 20 of the projector. The distance from the lens 34 is now substantially the same as the distance from the lens 33 when it was in the position shown in Fig. 3. The image of the light is therefore properly projected by the condenser lens into the pupil of the projecting lens which is in coincidence with the optical axis of the projector.

By thus shifting the lens and the illuminating system relative to the slide, it is possible to obtain different magnification as pointed out above.

A preferred form of the invention has been described. It is not intended, however, to limit the invention to the preferred form since other forms of projectors embodying the invention can be made as will be apparent to those skilled in the art.

I claim:

1. A lantern slide projector having an optical axis and comprising a stationary center portion, including a holder to hold a transparency in a plane perpendicular to and intersecting said optical axis, a first lens, a second lens of longer focal length, lens positioning means supporting said lenses and mounted for movement from a first position in which it holds said first lens intercepting said optical axis at a given distance from said holder to a second position in which it holds said second lens intercepting said optical axis at a greater distance from said holder than said first lens when it is at said optical axis to alternately position said lenses at said optical axis, an optical system comprising a light source and a condenser disposed at said optical axis, an illuminating system support supporting said illuminating system and movable toward and away from said center portion along said optical axis and means operatively connecting said lens positioning means and said illuminating system support comprising means operatively connected to said lens positioning means for movement when said lens positioning means is moved and operatively connected to said illuminating system support to move said support along said axis when operated by movement of said lens positioning means and to its greatest distance from said holder when the first lens is at the optical axis, said connection maintaining the distance between the illuminating means and the lens at the optical axis substantially constant for the different lenses.

2. A lantern slide projector having an optical axis and comprising a stationary center portion, including a holder to hold a transparency in a plane perpendicular to and intersecting said optical axis, said center portion having a forwardly and downwardly facing inclined face having a way therein, a lens carrier having a base slidably disposed in said way and carrying an upper shorter focal length lens and a lower longer focal length lens in position to intersect said optical axis alternately, said longer focal length lens being disposed farther forward of said base than the other lens, whereby said lenses may be alternately positioned at said optical axis and with said shorter focal length lens closer to said holder, an illuminating system comprising a light source and a condenser and an illuminating system carrier movable toward and away from said center portion parallel to said optical axis and carrying said illuminating system for movement along said optical axis and means for sliding said lens carrier to alternately position said lenses at said optical axis and for simultaneously shifting said illuminating system support away from said center portion when said upper lens is at the optical axis and for maintaining the distance between illuminating system and lens at the optical axis substantially constant comprising a bell crank lever pivoted on said center portion and having two legs and a link pivotally connecting one leg with said lens carrier and a link pivotally connecting said other leg with said illuminating system support.

3. A lantern slide projector having an optical axis and comprising a stationary center portion, including a holder to hold a transparency in a plane perpendicular to and intersecting said optical axis, said center portion having a forwardly and downwardly facing inclined face having a way therein, a lens carrier having a base slidably disposed in said way and carrying an upper shorter focal length lens and a lower longer focal length lens in position to intersect said optical axis alternately, said longer focal length lens being disposed farther forward of said base than the other lens, whereby said lenses may be alternately positioned at said optical axis and with said shorter focal length lens closer to said holder, an illuminating system comprising a light source and a condenser and an illuminating system carrier movable toward and away from said center portion parallel to said optical axis and carrying said illuminating system for movement along said optical axis and means for sliding said lens carrier to alternately position said lenses at said optical axis and for simultaneously shifting said illuminating system support away from center portion when said upper lens is at the optical axis and for maintaining the distance between illuminating system and lens at the optical axis substantially constant comprising means connected to and movable by movement of said lens carrier and connected to said illuminating system carrier to move the same along said optical axis on movement of said lens carrier.

4. A lantern slide projector having an optical axis and comprising a stationary center portion, including a holder to hold a transparency in a plane perpendicular to and intersecting said optical axis, said center portion having a forwardly and downwardly facing inclined face having a way therein, a lens carrier having a base slidably disposed in said way and carrying a pair of lenses in position to intersect said optical axis alternately, an illuminating system comprising a light source and a condenser and an illuminating system carrier movable toward and away from said center portion parallel to said optical axis and carrying said illuminating system for movement along said optical axis and means for sliding said lens carrier to alternately position said lenses at said optical axis and for simultaneously shifting said illuminating system support toward and away from said center portion and for maintaining the distance between illuminating system and lens at the optical axis substantially constant comprising a bell crank lever pivoted on said center portion and having two legs and a link pivotally connecting one leg with said lens carrier and a link pivotally connecting said other leg with said illuminating system support.

5. A lantern slide projector having an optical axis and comprising a stationary center portion, including a holder to hold a transparency in a plane perpendicular to and intersecting said optical axis, a lens carrier having a pair of projecting lenses of different focal lengths, means supporting said lens carrier for movement in a direction having a component transverse of said optical axis from a first position in which one lens is at the optical axis to a second position where the other lens is at said optical axis with the lens having the shorter focal length close to said holder, an illuminating system comprising a light source and a condenser disposed at said optical axis, a movable support for supporting said illuminating system for movement toward and from said center portion along said optical axis, an operating mechanism for moving said lens carrier from said first position to said second position and for simultaneously moving said illuminating system toward and away from said stationary portion to a point of focus with the pupil of the lens which is located at the optical axis comprising a bell crank lever having two legs pivotally connected to said stationary portion and having one leg pivotally connected to said lens carrier and the other leg pivotally connected to said illuminating system support.

6. A lantern slide projector having an optical axis and comprising a stationary center portion, including a holder to hold a transparency in a plane perpendicular to and intersecting said optical axis, a lens carrier having a pair of projecting lenses of different focal lengths, means supporting said lens carrier for movement in a direction having a component transverse of said optical axis from a first position in which one lens is at the optical axis to a second position where the other lens is at said optical axis with the lens having the shorter focal length closer to said holder, an illuminating system comprising a light source and a condenser disposed at said optical axis, a movable support for supporting said illuminating system for movement toward and from said center portion along said optical axis, an operating mechanism for moving said lens carrier from said first position to said second position and for simultaneously moving said illuminating system toward and away from said stationary portion to a point of focus with the pupil of the lens which is located at the optical axis comprising means connected to said lens carrier for movement on movement of said lens carrier from said first position to said second position and connected to said movable support for movement thereof along said optical axis simultaneously with movement of said lens carrier.

References Cited in the file of this patent

UNITED STATES PATENTS

| Number | Name | Date |
|---|---|---|
| 1,029,297 | Holst | June 11, 1912 |
| 2,204,709 | Straubel et al. | June 18, 1940 |
| 2,512,314 | Dutton | June 20, 1950 |

FOREIGN PATENTS

| Number | Country | Date |
|---|---|---|
| 18,346 | Great Britain | of 1898 |
| 506,822 | Great Britain | Aug. 30, 1937 |
| 927,024 | France | Apr. 28, 1947 |
| 642,883 | Great Britain | Sept. 13, 1950 |